United States Patent

[11] 3,544,702

| | | |
|---|---|---|
| [72] | Inventors | Walter Philipps,<br>1 Waldfriedenstr. 8022, Grunwald, and<br>Walter Buckner, Erlangen, Germany |
| [21] | Appl. No. | 754,401 |
| [22] | Filed | Aug. 21, 1968 |
| [45] | Patented | Dec. 1, 1970 |
| [73] | Assignee | said Buckner assignor to said Philipps |
| [32] | Priority | Aug. 25, 1967, April 26, 1968 |
| [33] | | Germany |
| [31] | | Nos. P-42,874 and P-1765276.5 |

[54] SUSPENSION FOR OVERHEAD CABLES
12 Claims, 8 Drawing Figs

[52] U.S. Cl..................................................... 174/42,
174/43; 248/63
[51] Int. Cl...................................................... H02g 7/00,
H02g 7/14
[50] Field of Search......................................... 174/40, 41,
42, 43, 45, 148, 149, 150; 248/58, 60, 61, 63, 64

[56] References Cited
UNITED STATES PATENTS

| | | | |
|---|---|---|---|
| 1,817,313 | 8/1931 | Hofmann...................... | 248/63 |
| 1,943,912 | 1/1934 | Bollinger....................... | 248/63 |
| 2,062,283 | 12/1936 | Austin........................... | 248/63 |
| 2,065,336 | 12/1936 | Langton........................ | 174/42 |
| 2,149,875 | 3/1939 | Talbott.......................... | 248/63 |
| 2,731,509 | 1/1956 | Becker.......................... | 174/42 |

FOREIGN PATENTS

| | | | |
|---|---|---|---|
| 684,540 | 3/1930 | France.......................... | 174/42 |
| 592,304 | 2/1934 | Germany...................... | 248/63 |
| 330,363 | 6/1930 | Great Britain................ | 248/63 |
| 357,878 | 10/1931 | Great Britain................ | 248/63 |
| 629,043 | 12/1961 | Italy.............................. | 174/41 |

*Primary Examiner*—Laramie E. Askin
*Attorney*—Curt M. Avery, Arthur E. Wilfond, Herbert L. Lerner and Daniel J. Tick ABSTRACT: Suspension for overhead cables includes a carrying device, and at least three individual clamps for holding the cable, the clamps being movably suspended from the carrying device and being spaced side-by-side from one another.

SUSPENSION FOR OVERHEAD CABLES

Our invention relates to suspension for overhead cables.

Cables for overhead electric lines, particularly high voltage lines, are secured by means of suspension clamps and one or two insulator strings or chains to a mast. Thus, for each cable suspension, a suspension clamp is used that is as light, i.e. as small, as possible, which takes into consideration the dynamic stresses produced due to oscillations of the cable. The generally trough-shaped portion or eye of such clamps, as a rule, have a predetermined curvature having a constant size which is established virtually independently of the range of application thereof, i.e. independently of the type of cable, the tension in the cable and the span of the cable, for example. The length of the contacting surface of the cable in the eye or trough of the suspension clamp is about five times the diameter of the cable.

Suspension clamps having longer contacting surfaces in the longitudinal direction of the cable are known. They have been provided with greater contacting surface length in order to keep the stresses due to static bending moments to the right- and left-hand side of the suspension points at a lower value. Also, these fixed longer clamps having constant curvature cannot, under all conditions, protect the cable, however, from damaging bending stresses. The length of the contacting surface in such case is about 40 times the diameter of the cable. The radius of curvature of the cable which, as is commonly known, varies for changes in temperature and stress, for example due to icing, at the suspension point, causes the production of additional bends at the clamping locations or the ends also of these fixed long clamps. The large moment of inertia of the long clamps swinging or oscillating with the cable is also undesirable due to the greater dynamic stresses. This is also the main reason for the limited use of such long clamps.

It is accordingly an object of our invention to provide suspension for overhead electric cables which avoids the aforementioned disadvantages of the heretofore known suspension systems therefor. With the foregoing and other objects in view, we accordingly provide such a suspension wherein the electrically conductive overhead cable is held by at least three individual clamps which are spaced from one another and movably suspended from a carrying device. The greater the number of individual clamps, the smaller the shearing force per clamp, i.e. the smaller the bending stress also. In accordance with a further feature of our invention, the individual clamps are suspended from the carrying device spaced from one another a distance greater than ten times the diameter of the conductive cable whereby both the dynamic as well as the static bending stresses are greatly reduced.

Thus, in accordance with our invention, the suspension permits both an automatic adjustment of the varying radius of curvature of the cable at the suspension point as well as an effective reduction of the static bending stress.

In accordance with other features of our invention, one or more beams are employed for the suspension of the individual clamps. The carrying device is formed of one or more beams and is suspended in turn by one or more insulator chains or strings from a mast. The shearing stresses at the individual clamps and the bending moments accordingly are distributed in accordance with the number of the clamps and the length of the carrying device. In this way, a highly uniform reliable distribution of the bending moments at several points for each condition of the cable is possible whereby minimum static bending stresses occur. An automatic adjustment of the clamps is thereby produced for different temperatures or high or low drawing of the cable. This occurs particularly when using two beams and virtually also for an elastic beam.

In the case of a carrying device with one beam, in accordance with our invention, the attachment of the clamps to the beam when more than two suspension clamps are used is effected with straps of different length in order to obtain an adjustment or accommodation to the form of the cable, i.e. a most uniform distribution of the bending moment possible, at least in the assembled state thereof. The carrying device, in accordance with our invention, can also comprise a plurality of individual beams, for example the individual clamps can be directly held by two beams which are in turn pivotally mounted on a third beam. Moreover, the suspension of the clamps can also be effected on an elastically constructed carrying beam. The straps provide according to our invention for the suspension of the clamps from the carrying beam and also have the construction of insulators, and the beam can then be fastened directly to the supporting mast.

In accordance with yet additional features of the invention, particularly with regard to economic advantages thereof, the suspension can be provided with one or more cables which act as the carrying device, the electrically conductive cable being movably held thereon by means of individual clamps. In such an improved embodiment of our invention, the individual clamps can be fastened to the cable by pressing. It is particularly advantageous and minimizes assembly work considerably to construct the individual clamps and the carrying cable as a prefabricated structural component.

With the suspension system according to our invention, an additional damping can be achieved in a most expedient manner by having the cable holding the individual clamps project over and beyond both endmost individual clamps supporting the conductive cable and by providing damping weights at the ends of the supporting cable.

Other features which are considered as characteristic for the invention are set forth in the appended claims.

Although the invention is illustrated and described herein as embodied in suspension for overhead cables, it is nevertheless not intended to be limited to the details shown, since various modifications and structural changes may be made therein without departing from the spirit of the invention.

The construction and method of operation of the invention, however, together with additional objects and advantages thereof will be best understood from the following description of specific embodiments when read in connection with the accompanying drawings, in which.

Figure 1:
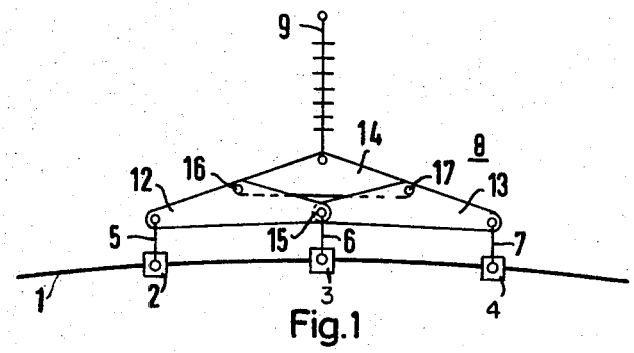
FIGS. 1, 1a, 2 and 2a are diagrammatic views of different embodiments of the suspension system of our invention.
Figure 1A:
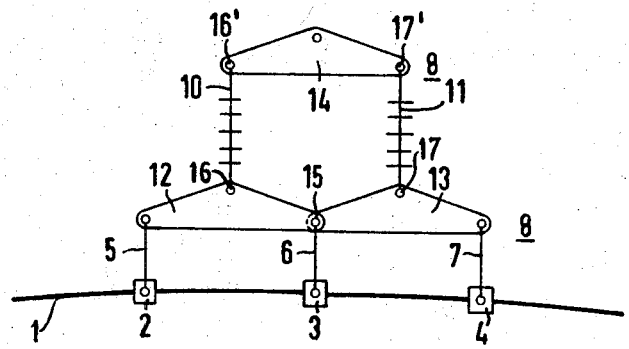

Referring to the drawings and now particularly to FIGS. 1 and 1a thereof, there is shown schematically the suspension of an electrically conductive cable 1 by means of three conventional lightweight suspension clamps 2, 3 and 4, which are held pivotally by straps 5, 6 and 7 on a carrying device 8. The straps 5, 6 and 7 are suspended pivotally both at the clamps 2, 3 and 4 as well as at the carrying device 8. The carrying device 8 can be secured to a mast by one insulator chain or string 9 (FIG. 1) or by two insulator chains 10 and 11 FIG. 1a).

By employing a plurality of pivotally mounted and suspended individual clamps 2, 3 and 4, the clamps are accommodated or adjusted to the respective radius of curvature of the cable 1. For this purpose, the center clamp 3 is held by a strap 6 of relatively shorter length than the straps 5 and 7 to the carrying device 8. The suspension effected by pivotally mounted individual clamps produces an automatic accommodation with respect to the adjustment of the clamps in the longitudinal direction of the cable for the respective temperatures that occur as well as for varying loads or stresses.

In the embodiments of FIGS. 1 and 1a there is provided a carrying device formed of three beams 12, 13 and 14. As a special application, both carrier beams 12 and 13 located adjacent one another are articulatingly connected at 15. They can also be arranged so that they are separated from one another if desired. In FIG. 1, the carrier beams 12 and 13 are also articulatingly connected with a beam 14 at the points 16 and 17, the suspension proper being effected by an insulator chain or string 9 attached to the middle of the beam 14. If suspension is to be effected by two insulator chains or strings 10 and 11 connected at the points 16 and 17 as in FIG. 1a, then the strings 10 and 11 are connected at 16' and 17' to the beam 14. By using a plurality of articulatingly connected carrier beams 12 and 13, the shear forces and the bending moment, accordingly, are distributed in accordance with the horizontal spacing from the point 16 to clamps 2 and 3 or from the point 17 to the clamps 3 and 4. These spacings are wisely selected so that a smaller bending stress is produced at the outer clamps than at the inner clamp or clamps, since the greater dynamic stresses occur at the outside. Each of the pivotally suspended clamps 2, 3 and 4 are subjected to equal loading. The distance between the mutually spaced individual clamps is at least ten times the diameter of the conductive cable. With the articulated suspension, by means of two or three articulatingly connected beams having two individual clamps respectively, the straps 5, 6, 7 etc. can be of the same length because the adjustment or accommodation thereof to the shape of the conductive cable is effected by tilting of the beams.

Figure 2:
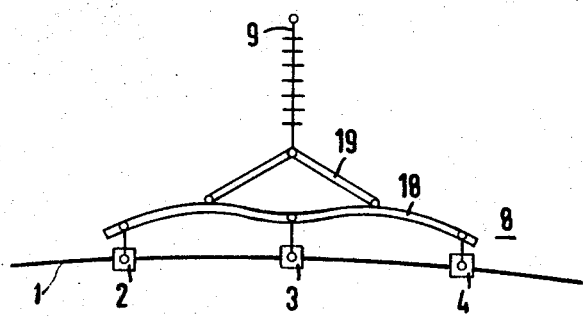
Figure 2A:
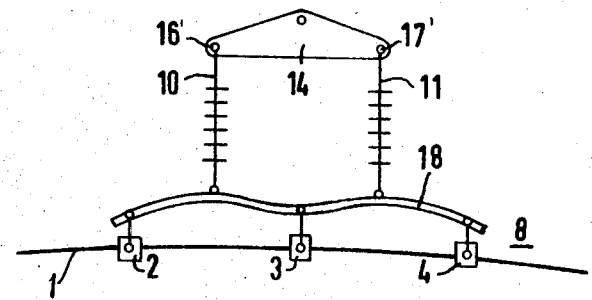

In FIG. 2 there is a diagrammatically shown an embodiment of our invention wherein the conductive cable 1 is suspended by means of individual clamps 2, 3 and 4 on an elastically constructed carrier beam 18. The carrier beam 18 is secured through linkages 19 and an insulator chain or string 9 to a nonillustrated mast. In the embodiment of FIG. 2a, two insulator chains 10 and 11 are employed, however, instead of the linkages 19 and the insulator chain 9. Due to the elastic construction of the carrier beam 18 and the individual clamps 2, 3 and 4 pivotally suspended therefrom, a considerably uniform shear stress distribution is assured.

Figures 3, 3A:
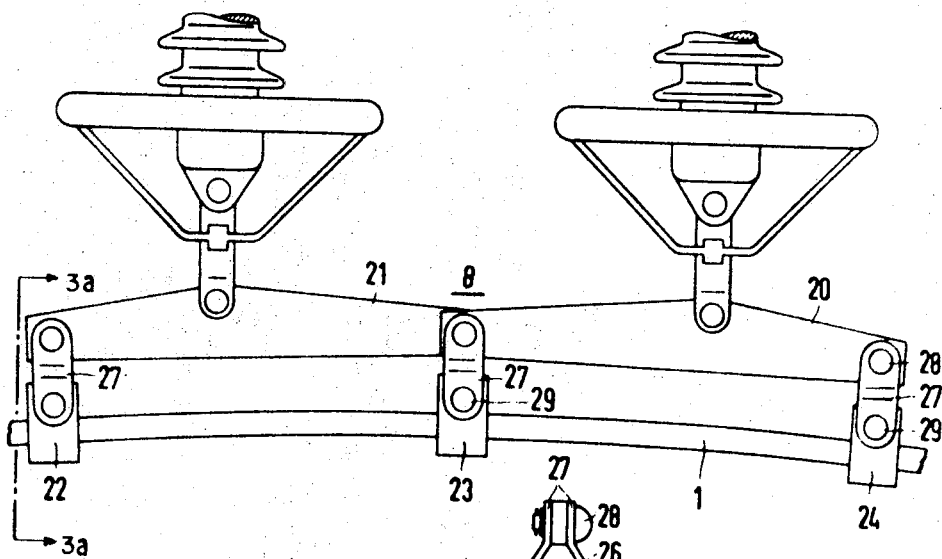
FIG. 3 is a side elevational view showing the construction of yet another embodiment of the invention.
FIG. 3a is a sectional view of FIG. 3 taken along the line 3a—3a in the direction of the arrows.

In FIG. 3 there is shown the construction of another embodiment of the suspension system of our invention. A conductive cable 1 is pivotally suspended by clamps 22, 23 and 24 to carrier beams 20 and 21. As shown in cross section in FIG. 3a, the cable 1 is clasped between two clamping jaws 25 which are pressed together by two threaded bolts 26.

The pivotal suspension on the carrier beams 20 and 21 is effected with straps 27 which hold the clamps 22, 23 and 24, respectively, by means of two pins or bolts 28 and 29. The clamps 22, 23 and 24 are pivotally suspended both by the respective pins 28 as well as by the respective pins 29 through the respective straps 27.

Clamps may also be used wherein the lower pivot pins 29 for the respective straps 27 are located at the level of the conductive cable or above the same. The straps 27 can also be secured rigidly to the carrier beams 20 and 21 or to a part of the individual clamps.

The individual clamps can be furnished with elastic material on the curved interior surface thereof with which the conductive cable would otherwise come into contact, so as to thereby reduce the transverse compression of shear stress exerted on the cable.

Figure 4:
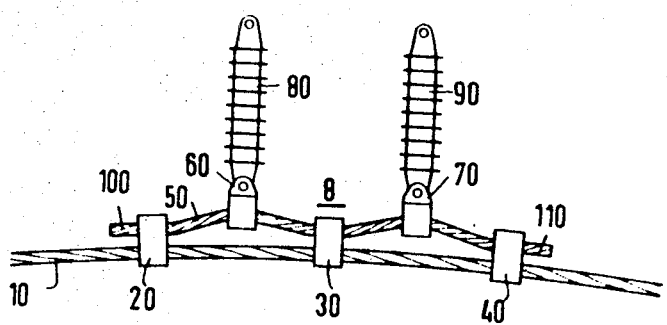
FIGS. 4 and 5 are additional diagrammatic views of other embodiments of the suspension system.
Figure 5:
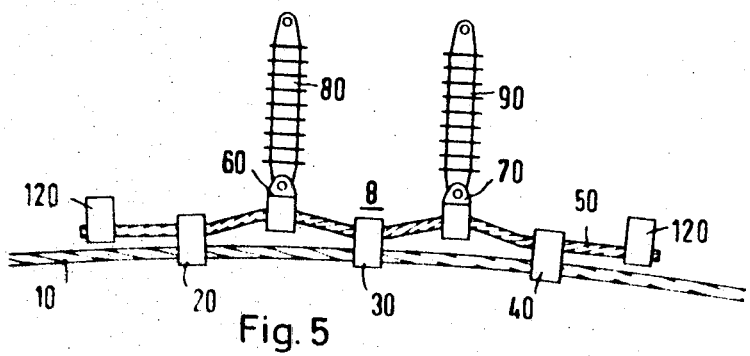

In FIGS. 4 and 5 there are shown modified embodiments of our suspension system wherein an overhead conductive cable 10 is held by three individual clamps 20, 30 and 40 on a supporting cable 50 preferably formed of steel. Of course, a plurality of supporting cables 50, which are disposed adjacent or above one another, can also be used. The supporting cable 50 forms the carrier device for the suspension system of the overhead conductive cable 10. The supporting cable 50 is carried for example by insulator chains or strings 80 and 90 through clamps 60 and 70. The individual clamps 20, 30 and 40 can also have a bipartite construction and can form an articulating joint.

The clamps 20, 30 and 40 are secured to the supporting cable 50 by being pressed thereon. It is thereby possible to produce the individual clamps with the supporting cable 50 as a prefabricated structural component so as to minimize the assembly work when suspending the conductive cable 10.

Both ends 100 and 110 of the support cable 50 can be elongated so that they project over and beyond the two outer or endmost clamps 20 and 40 and, as shown in FIG. 5, a weight 120 can be suspended from the cable ends 100 and 110, respectively, for damping or annulling vibrations of the cable 50. In this manner, an additional damping as for the so-called Stockbridge damping is achieved advantageously.

We claim:

1. Suspension system for an overhead electric cable comprising a first carrying device, at least three individual clamps for movably holding an overhead cable, said clamps being movably suspended from spaced suspension points on said first carrying device, and means comprising a second carrying device having two spaced suspension points, said first carrying device being suspended at points intermediate said spaced suspension points thereon from said two spaced suspension points of said second carrying device.

2. Suspension system according to claim 1 wherein said clamps are pivotally suspended from said first carrying device.

3. Suspension system according to claim 1 wherein said carrying device comprises at least one supporting cable.

4. Suspension system according to claim 1 wherein said clamps are spaced from one another a distance equal to at least ten times the diameter of the electric cable.

5. Suspension system according to claim 1 wherein said first carrying device comprises a pair of adjacent beams extending in direction of a cable being carried thereby, and said second carrying device comprising a third beam, said pair of adjacent beams being pivotally suspended from said third beam.

6. Suspension system according to claim 1 wherein said first carrying device comprises a support beam of elastic construction.

7. Suspension system according to claim 1 including at least three straps pivotally suspended from said first carrying device, said clamps, respectively, being pivotally suspended from said straps.

8. Suspension system according to claim 1 wherein said second carrying device comprises insulator means, said first carrying device being pivotally suspended from said insulator means.

9. Suspension system according to claim 8 wherein said first carrying device comprises a support cable, and including additional clamps for securing said insulator means to said support cable, said individual clamps and said additional clamps being secured by compression.

10. Suspension system according to claim 8 wherein said first carrying device comprises a support cable, and including additional clamps for securing said insulator means to said support cable, said individual clamps and said additional clamps for said insulator means with said support cable being formed as a prefabricated structural component.

11. Suspension system according to claim 1 wherein said first carrying device comprises at least one supporting cable adapted to support a suspended cable extending in a given direction therefrom, said supporting cable being formed with a predetermined bend extending in a direction opposite to said given direction.

12. Suspension system according to claim 1 wherein said first carrying device comprises a support cable, said individual clamps being spaced along said support cable, and said support cable having end portions projecting beyond the endmost individual clamps, and including weights respectively secured to said end portions of said support cable.